(12) United States Patent
Artin

(10) Patent No.: US 9,580,945 B2
(45) Date of Patent: Feb. 28, 2017

(54) HOLD OPEN ROD LOCKING SLEEVE

(71) Applicant: HARTWELL CORPORATION, Placentia, CA (US)

(72) Inventor: Bo D. Artin, Placentia, CA (US)

(73) Assignee: Hartwell Corporation, Placentia, CA (US)

( * ) Notice: Subject to any disclaimer, the term of this patent is extended or adjusted under 35 U.S.C. 154(b) by 0 days.

(21) Appl. No.: 14/440,805

(22) PCT Filed: Nov. 3, 2013

(86) PCT No.: PCT/US2013/068187
§ 371 (c)(1),
(2) Date: May 5, 2015

(87) PCT Pub. No.: WO2014/071270
PCT Pub. Date: May 8, 2014

(65) Prior Publication Data
US 2015/0284978 A1    Oct. 8, 2015

Related U.S. Application Data

(60) Provisional application No. 61/722,762, filed on Nov. 5, 2012.

(51) Int. Cl.
*E05C 17/02* (2006.01)
*E05C 17/30* (2006.01)
(Continued)

(52) U.S. Cl.
CPC .............. *E05C 17/02* (2013.01); *E05C 17/30* (2013.01); *F16F 9/0254* (2013.01); *F16F 9/56* (2013.01)

(58) Field of Classification Search
CPC ........ E05C 17/02; E05C 17/30; F16F 9/0254; F16F 9/56
(Continued)

(56) References Cited

U.S. PATENT DOCUMENTS 3,945,744 A * 3/1976 Metz ..................... E02D 17/083
403/317
5,265,970 A * 11/1993 LaBarre ................ F16B 21/165
403/108
(Continued)

FOREIGN PATENT DOCUMENTS

| CA | 1129620 | 8/1982 |
|---|---|---|
| CN | 2159488 | 3/1994 |
| CN | 101346576 | 1/2009 |

OTHER PUBLICATIONS

Search Report & Written Opinion issued in Int'l App. No. PCT/US2013/068187 (2014).
(Continued)

*Primary Examiner* — Adriana Figueroa
*Assistant Examiner* — Jessie Fonseca
(74) *Attorney, Agent, or Firm* — Barnes & Thornburg LLP

(57) ABSTRACT

The present disclosure includes a telescoping hold open rod which is controllably lockable and unlockable for use in holding a panel such as a nacelle open to provide a user access to an opening covered by the panel. The hold open rod is useful in allowing the rod to be unlocked and telescopically collapsed. The rod can be locked into a telescopically extended position to maintain the panel in an open position relative to the opening to facilitate access to the opening without the rod telescoping closed. A retention assembly includes structures and devices to maintain the rod in an open condition although subject to compressive loads.

20 Claims, 12 Drawing Sheets

(51) Int. Cl.
  *F16F 9/56* (2006.01)
  *F16F 9/02* (2006.01)

(58) Field of Classification Search
  USPC .................. 248/602, 351, 354.1, 357, 562
  See application file for complete search history.

(56) References Cited

U.S. PATENT DOCUMENTS

| | | |
|---|---|---|
| 5,417,511 A | 5/1995 | Warden |
| 5,950,997 A | 9/1999 | Metz |
| 6,193,223 B1 | 2/2001 | Jackson |
| 7,654,371 B1 * | 2/2010 | Metz .................. F16F 9/56 |
| | | 188/300 |
| 8,147,358 B2 * | 4/2012 | Chen .................. A63B 61/02 |
| | | 473/492 |
| 2010/0024161 A1 | 2/2010 | Wood et al. |
| 2010/0307872 A1 | 12/2010 | Wheeler et al. |
| 2013/0146736 A1 * | 6/2013 | Wheeler ............ E05C 17/30 |
| | | 248/354.1 |

OTHER PUBLICATIONS

Office Action issued in application No. CN 2013800693403 (issued Apr. 15, 2016).
Supplementary European Search Report issued in App. No. EP 13851198 (May 23, 2016).

\* cited by examiner

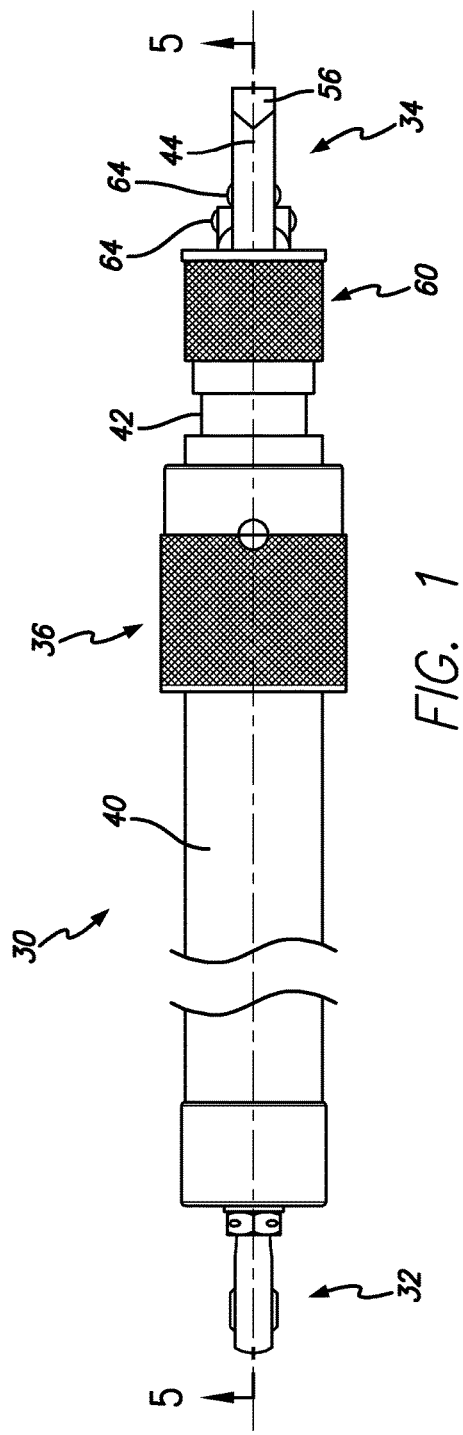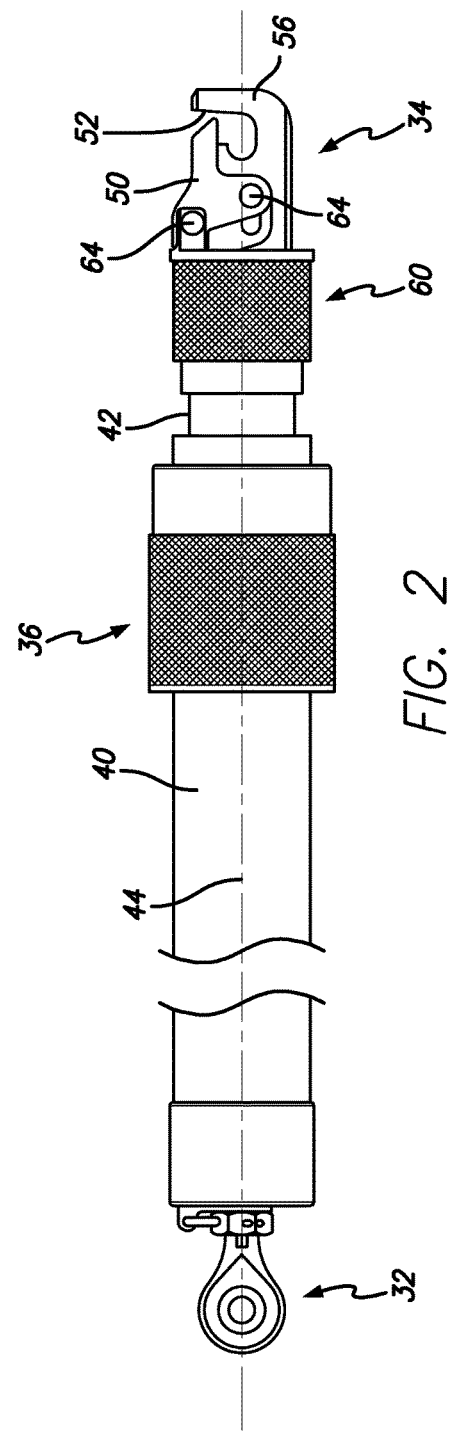

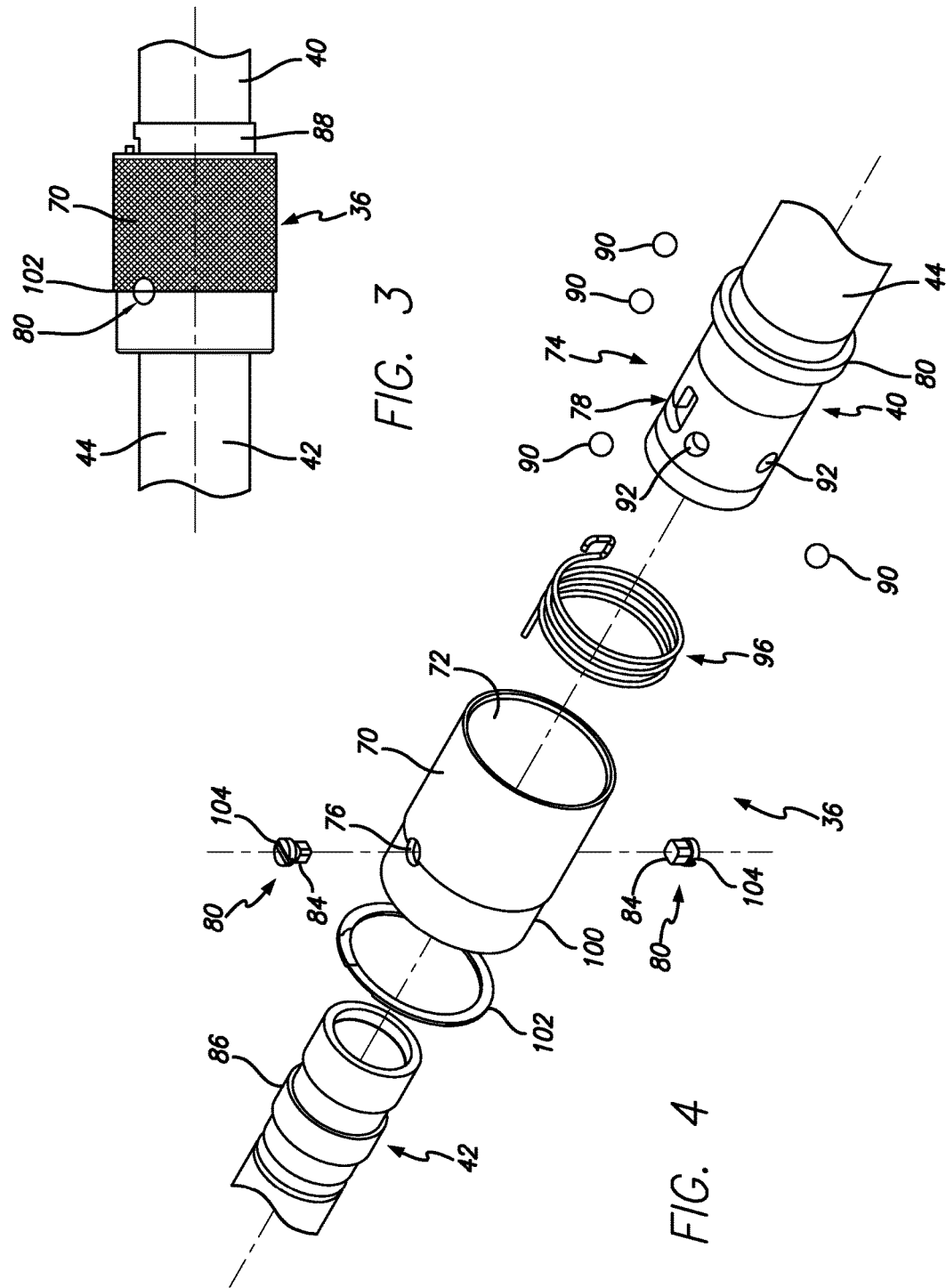

HOLD OPEN ROD LOCKING SLEEVE

CROSS REFERENCE TO RELATED APPLICATIONS

This application is a U.S. nationalization under 35 U.S.C. §371 of International Application No. PCT/US2013/068187, filed Nov. 3, 2013, which claims the benefit of priority under 35 U.S.C. §119(e) to U.S. Provisional Patent Application No. 61/722,762, filed Nov. 5, 2012. The disclosures set forth in the referenced applications are incorporated herein by reference in their entireties.

BACKGROUND

The present disclosure includes a telescoping hold open rod which is controllably lockable and unlockable for use in holding a panel open to provide a user access to an opening covered by the panel. The hold open rod is useful in allowing the rod to be unlocked and collapsed when subject to a compressive load. The rod can be locked into an extended position to maintain the panel in an open position relative to the opening to facilitate access to the opening without the rod telescoping closed. A retention assembly includes structures and biasing devices to maintain the rod in an open condition although subject to compressive loads.

Prior art devices tend to provide a telescoping hold open rod which can be used to open a panel but which rod employs discreet mechanical locking features to maintain the rod in an open condition. Such locking features may include a removable pin which is controllably inserted into holes which are aligned when the rod is telescoped into an open position.

This background information is provided to provide some information believed by the applicant to be of possible relevance to the present disclosure. No admission is intended, nor should such admission be inferred or construed, that any of the preceding information constitutes prior art against the present disclosure. Other aims, objects, advantages and features of the disclosure will become more apparent upon reading of the following non-restrictive description of specific embodiments thereof, given by way of example only with reference to the accompanying drawings.

BRIEF DESCRIPTION OF THE DRAWINGS

The present disclosure will be described hereafter with reference to the attached drawings which are given as a non-limiting example only, in which:

FIG. 1 is a side elevational view of a hold open rod assembly of the present disclosure showing the exterior surfaces of the rod assembly, a portion of the rod being fragmented to show the relevant portions while removing length in the rod which is not necessary for the full description, the rod including a bearing end, a latching end, a sleeve assembly associated with the latching end to facilitate movement of a pin to permit engagement and disengagement of a structure in the latching end; and a rod telescoping locking sleeve assembly facilitating engagement and disengagement of the rod in an open and a closed position;

FIG. 2 is a top plan view of the hold open rod assembly of FIG. 1;

FIG. 3 is an enlarged view of the locking sleeve assembly as shown in FIGS. 1 and 2;

FIG. 4 is an exploded, partial fragmentary view of the locking sleeve assembly as shown in FIGS. 1-3, illustrating the arrangement of the spiral radial retaining ring relative to the sleeve barrel and pins retained on the barrel in a corresponding aperture and retained in place by the ring, a tortional spring being retained between the inner surface of the sleeve barrel and an outer surface of an outer tube;

Figure 5:
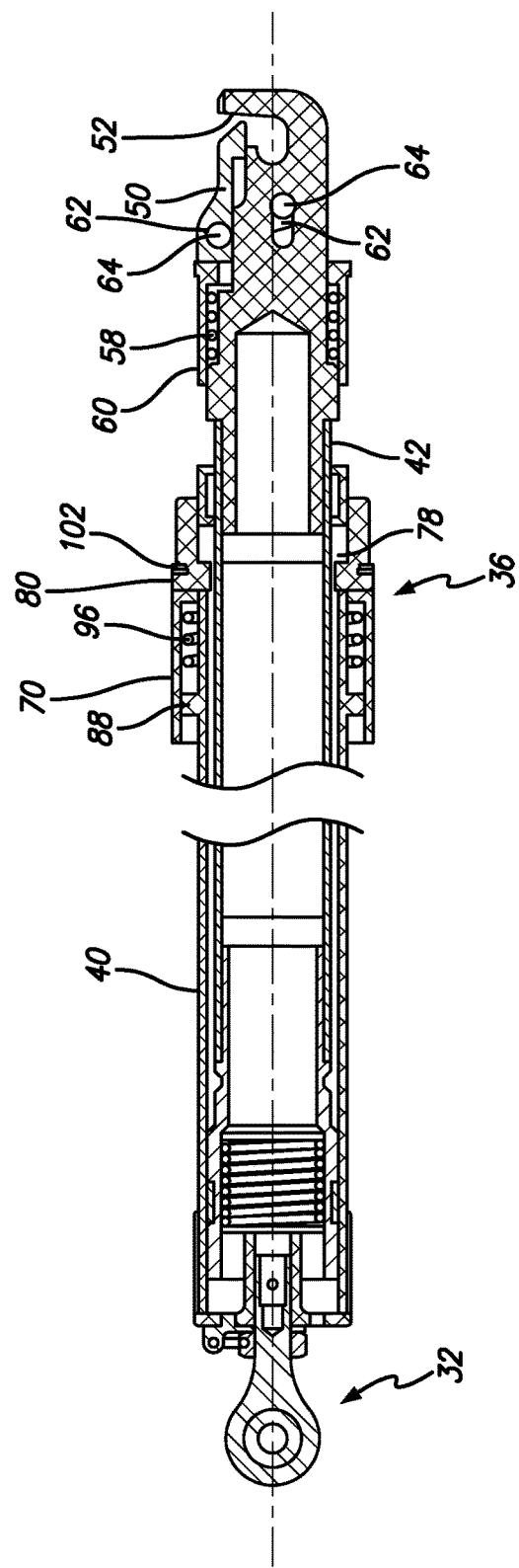
FIG. 5 is a partial fragmentary cross-sectional side elevational view taken along the lines 5-5 in FIG. 1 to help illustrate the relationship of the various features of the hold open rod locking sleeve and assembly.

The exemplification set out herein illustrates embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure. The disclosure is not limited in its application to the details of structure, function, construction, or the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of various phrases and terms is meant to encompass the items or functions identified and equivalents thereof as well as additional items or functions. Unless limited otherwise, various phrases, terms, and variations thereof herein are used broadly and encompass all variations of such phrases and terms. Furthermore, and as described in subsequent paragraphs, the specific configurations illustrated in the drawings are intended to exemplify embodiments of the disclosure. However, other alternative structures, functions, and configurations are possible which are considered to be within the teachings of the present disclosure. Furthermore, unless otherwise indicated, the term "or" is to be considered inclusive.

The foregoing terms as well as other terms should be broadly interpreted throughout this application to include all known as well as all hereafter discovered versions, equivalents, variations and other forms of the abovementioned terms as well as other terms. The present disclosure is intended to be broadly interpreted and not limited.

With reference to FIG. 1, the hold open rod assembly 30 is shown. The rod assembly includes a rod and radial bearing at a bearing end 32 with a latching end 34 spaced therefrom. A locking sleeve assembly 36 is positioned between the two ends 32, 34 generally proximate the latching end 34. The assembly 30 includes, generally, an outer tube 40 and a corresponding inner tube assembly 42. The inner tube 42 generally is telescopically arranged along a central axis 44 of the overall assembly 30 to facilitate telescopic collapsing of the overall assembly 30 to reduce the overall size of the assembly when collapsed. The telescopic arrangement along the central axis 44 also allows for a relatively significant extended length. In the extended position the locking sleeve assembly 36 helps retain the assembly 30 in its elongated extended orientation. The locking sleeve assembly 36 also helps prevent unintended collapse of the telescoping assembly when placed in a compressive load. A compressive load may occur when the rod is used to support a nacelle, panel or other structure to hold the panel in an open position. The locking sleeve assembly 36 is controllable to allow the operator to controllably extend the assembly 30 and lock it in the extend position as well as to unlock the assembly and allow to be telescopically collapsed.

A sleeve assembly is provided in conjunction with the latching end to facilitate controlled locking and unlocking of a pin 50 relative to the mouth 52 of a corresponding hook 56 which can be used to engage a corresponding structure when positioning the assembly to maintain a nacelle in an open position. A spring 58 (see FIG. 5) urges the sleeve 60 along the axis 44 towards the hook 56. The operator urges the sleeve 60 opposite the hook 56 to draw the pin 50 away from the hook 56 to open the mouth to receive the structure. Corresponding bushings 62 and rivets 64 maintain the structures relative to the sleeve 60.

A similar structure is used with regard to the locking sleeve assembly 36 as shown in additional detail in FIGS. 3 and 4. The locking sleeve assembly 36 includes the sleeve barrel 70 having an inner surface 72, described in greater herein below. The sleeve 70 is positioned over the outer tube 40 in a position in which apertures 76 through the sleeve 70 can be controllably aligned with a slot 78 in the outer tube 40. Corresponding pins 80 are in engaged in the aperture 76 with a tip 84 of the pins 80 engaged in the open area of the slot 78. The pins 80 key into the slot 78 to provide controlled movement of the sleeve relative to the slot to perform locking and unlocking operations which allow the outer tube 40 telescope over the inner tube 42. Corresponding control portions 74 of the outer tube 40 and 84 of the inner tube 42 are described in greater detail below.

A collar 88 on the outer tube 40 limits the range of motion of the sleeve 70 along the central axis 44. As can be seen on the outside of the sleeve 70, the sleeve is intended to be moved along the axis or "pulled" and to be rotated or "twisted" about the axis 44.

With further reference to the Figures, a group of ball bearings 90 are retained in corresponding holes 92 of the outer tube 40 and cooperatively engage inside surfaces of the inner portion 72 on the sleeve 70. The ball bearings also engage corresponding portions of the inner tube 42 during controlled operation of the inner tube 42 and outer tube 40.

A torsion spring 96 is positioned between the inner surface of the barrel and the outer surface 98 of the outer tube 40. The spring 96 is attached to the inside of the sleeve 70 and to the outside of the outer tube 40 to resist torsional or twisting rotation of the sleeve. The spring 96 allows the sleeve 70 to be returned to a locked position in which the tube assembly 30 is locked open or locked closed.

The pins 80 mentioned above are retained in the apertures 76. A groove 100 extends around the circumference of the sleeve 70 intersecting the aperture 76. A spiral radial retaining ring 102 is fitted in the groove 100 to retain the pins 80 in position in the aperture 76. Slots 104 are formed in the head of the pins 80. The pins are oriented in the aperture 76 with the slots 104 aligned with the groove 100, in this regard, the retaining ring 102 can extend around the sleeve 70 through the groove 100 and extend through the slot 104 of the pins 80. Engagement of the ring with the pins helps retain the pins in the aperture 76 but allows for controllable removal of the pins 80 if necessary.

Figure 6:
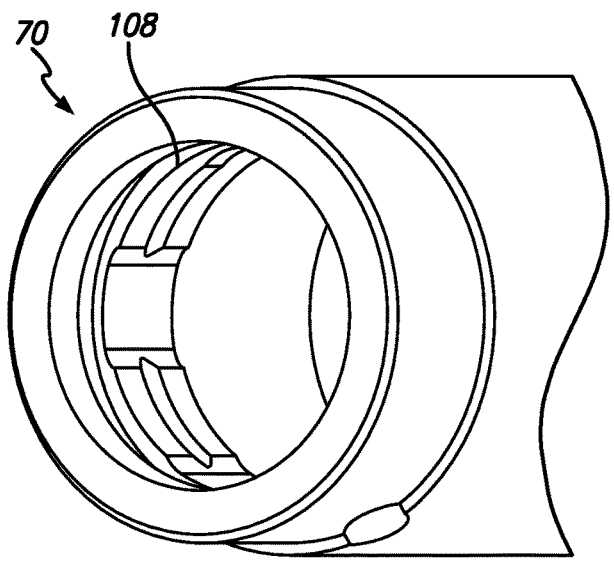
FIG. 6 is a partial fragmentary interior perspective view of internal diameter grooves.
Figure 7:
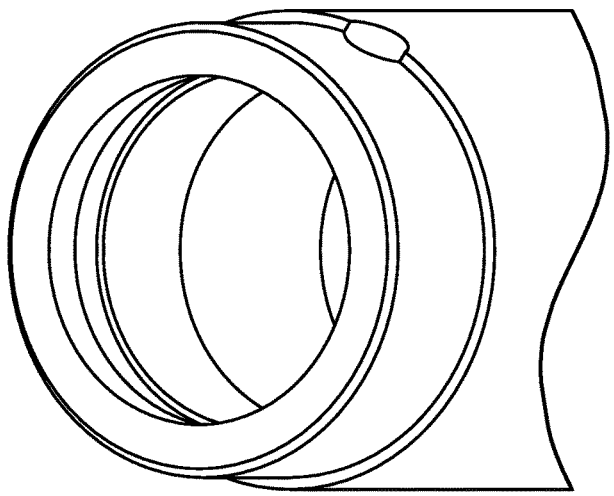
FIG. 7 is a similar view of a prior art sleeve.
Figure 8:
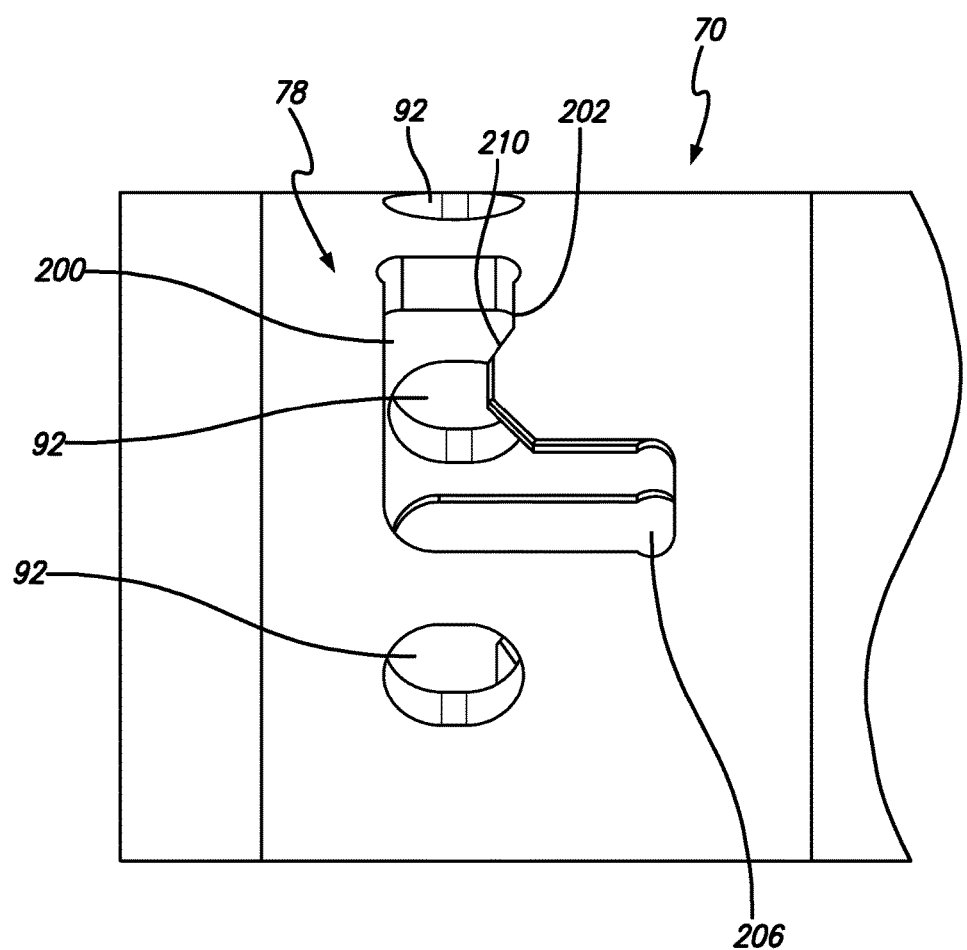
FIG. 8 is an enlarged perspective view of an L-shaped slot which is cooperatively engaged by the pin of the locking sleeve assembly to facilitate controlled movement of the sleeve assembly relative to the corresponding outer tube in which the L-shaped slot is formed.

With reference to FIGS. 6 and 7, the prior art sleeve (FIG. 7) included a sleeve internal diameter which has been changed in the current design by including an internal groove 108. The internal groove allows for engagement of corresponding ball bearings 90. Cutouts 106 allow for axial movement of the sleeve 70.

Figure 12:
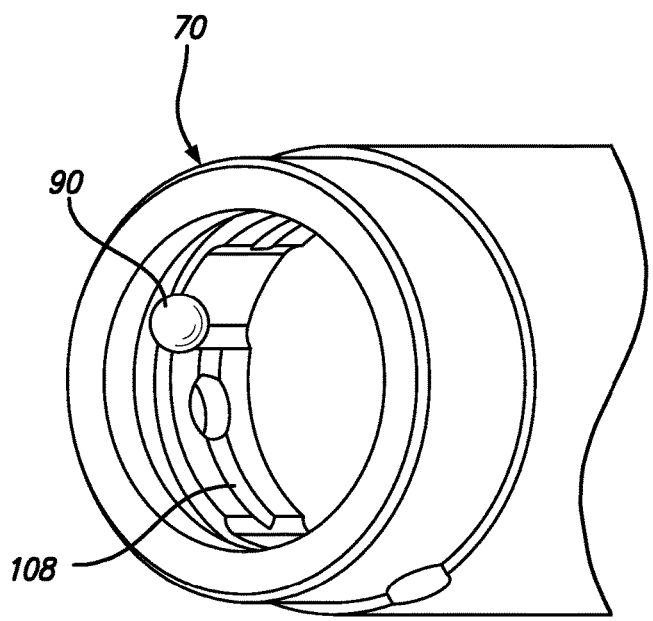
FIG. 12 is a partial fragmentary perspective view showing a ball engaging a slot in the sleeve of the locking sleeve assembly.

Support for the amendment can be found in at least FIG. 12 of Prov. App. Ser. No. 61/722,762, filed Nov. 5, 2012, to which the present application claims priority.

Figure 9:
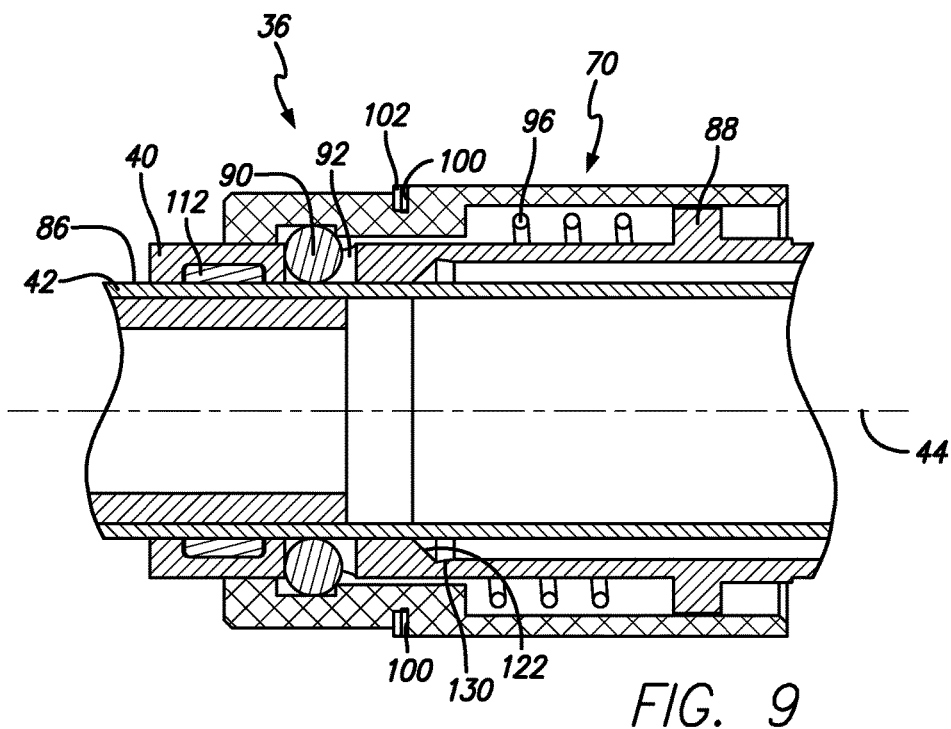
FIG. 9 is an enlarged cross sectional view of the locking sleeve assembly in which the rod is in a closed or telescopically collapsed orientation.

With reference to FIG. 9, closed strut or telescoping rod assembly is shown. The enlarged partial fragmentary cross sectional view shows the balls 90 engaged in the corresponding bores 92 positioned on the outside 86 of the inner tube 42. A Teflon sleeve 112 is provided between the inside surface of the outer tube 40 and the outside surface 86 of the inner tube 42 to facilitate sliding movement between the two tubes. The retaining ring 102 is shown in engagement in the groove 100.

Figure 10:
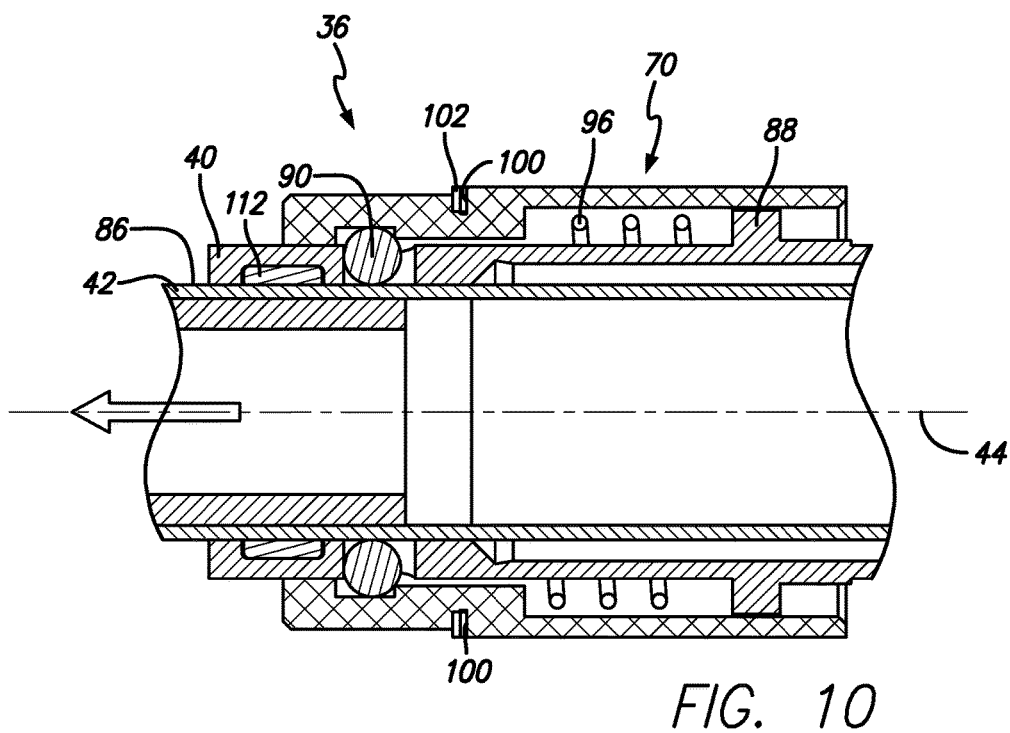
FIG. 10 illustrates the first step of extending the inner tube relative to the outer tube.

FIG. 10 shows the conditions in which the rod assembly can be extended generally showing movement of the tubes 42 along the axis 44 relative to the corresponding outer tube 40. As the inner sleeve is extended corresponding surfaces 120 on the inner tube 42 and on the outer tube and 122 on the outer tube 40 allow for forces pulling on the assembly or placing it in a tension load to carry those forces as suggested in FIG. 11. By providing these mating surfaces 120, 122 the load is carried by the structural material of the tubes 42, 40 and not on the precision ball bearings 90. Ball bearings 90 fall into a groove 124 to allow sleeve 70 to axially translate. A relief area 130 in the form of an internal annular groove provided on the inside surface of the outer tube prevents binding of the material on the corresponding mating surface 120 of the inner tube 42 against the similarly beveled surface 122 and the inside surface of the corresponding tube as suggested in FIG. 9.

Figure 11:
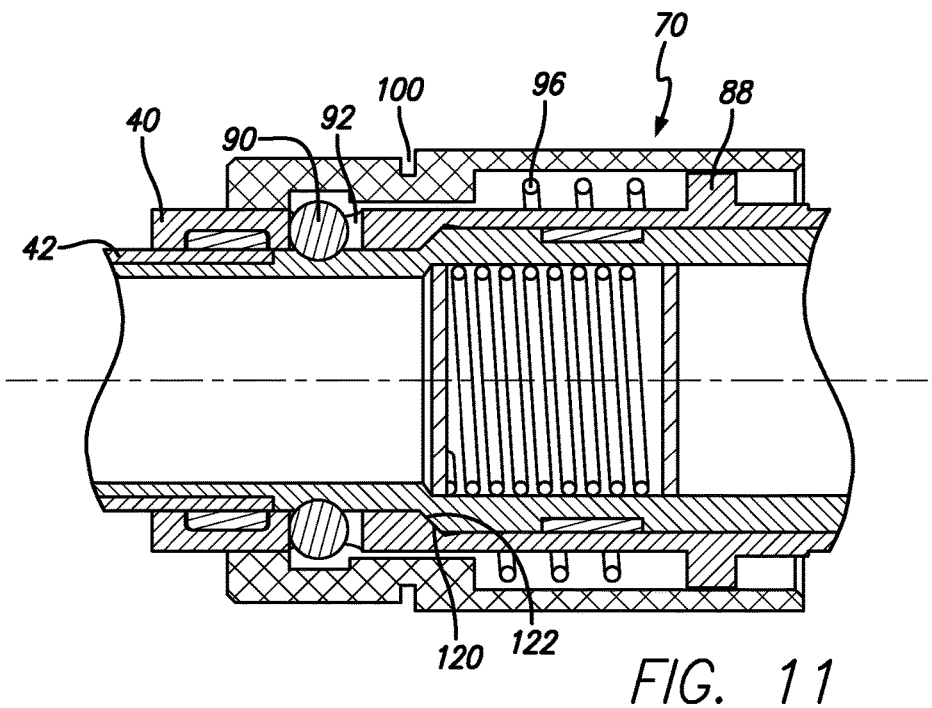
FIG. 11 shows the continued extension of the inner tube relative to the outer tube and so a portion of the inner tube is engaged with a portion of the outer tube.

Support for the amendment can be found in at least FIGS. 9-11 of Prov. App. Ser. No. 61/722,762, filed Nov. 5, 2012, to which the present application claims priority.

The locking sleeve assembly of the present disclosure allows the telescoping rods 40, 42 to be extended or collapsed along the axis 44. The twisting and pulling of the sleeve allow the balls 90 to be disengaged to unlock the inner tube 42 from the outer tube 40. The twisting and pulling occurs as a result of forces applied to the sleeve 70 but also as a result of movement of the heads or tips 84 of the pins 80 in the corresponding slot 78.

Figure 19:
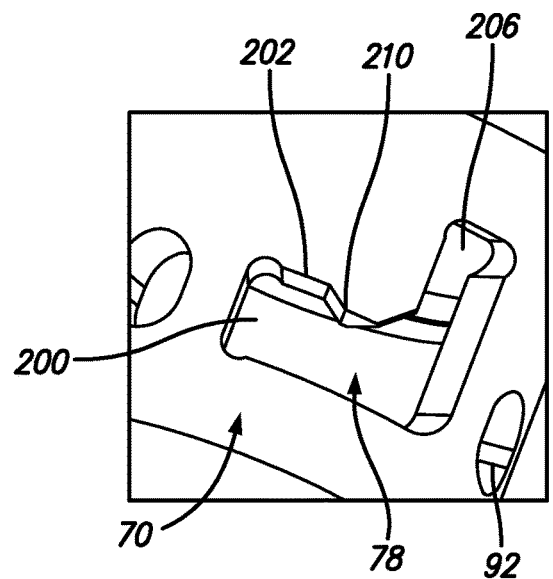

When the rods are extended the position can be locked by rotating or releasing the sleeve so that the pin engages in the circumferential portion 200 (see FIG. 19) of the slot. The circumferential portion of the slot includes a notch 202 which receives the pin when the extended strut is placed in a compressive load. While the pin does not necessarily contain the compressive load, the compressive load is carried by the balls 90 and groove 124, is locked in position to prevent disengagement. As the sleeve 70 rotates, the groove 108 turns over the ball bearings 90 and captures the ball bearings 90 in the groove 124 as suggested in FIG. 15.

Figure 15:
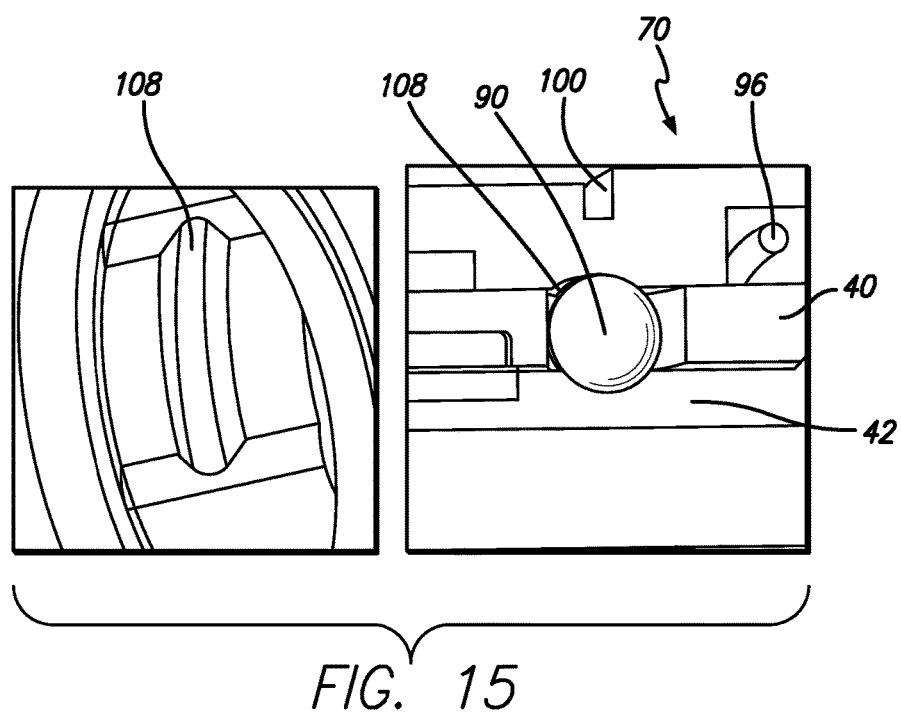
FIG. 15 illustrates the interaction of the ball in a corresponding groove upon rotation of the sleeve.
Figure 17:
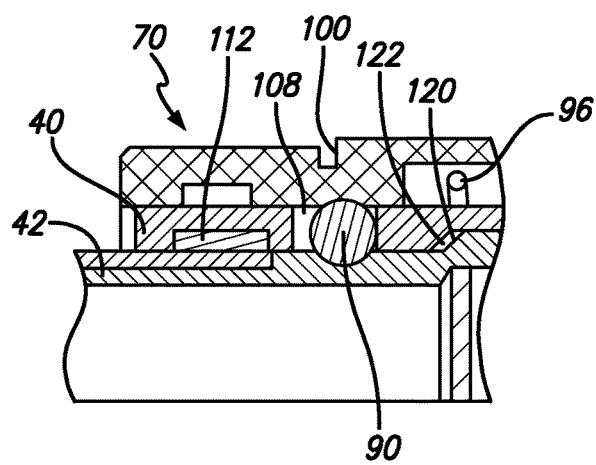
FIG. 17 shows an enlarged view of the ball area as shown in FIG. 16 during an initial step in which the rods are being compressed showing that the corresponding ball bearings carry the load in this compressive state.

Support for the amendment can be found in at least FIGS. 15 and 17 of Prov. App. Ser. No. 61/722,762, filed Nov. 5, 2012, to which the present application claims priority.

With the compressive load released, the sleeve 70 can be rotated to move the pin out of the notch 202 and rotate the sleeve carrying the pin through the circumferential portion 200 of the slot towards an axial portion 206 of the slot. The pin can be retained in the axial portion 206 of the slot as the rods are collapsed to prevent unintended locking during this process.

With reference to the slot and the corresponding notch 202, a ramp 210 has been provided to facilitate easier operation by the user when rotating the sleeve 70 without the strut under a compressive load. This combination of the pin and slot assembly helps to provide a positive locking of the sleeve in the desired position, either extended and locked, or collapsed and locked.

In use, the telescoping hold open rod assembly 30 is controllably lockable in an extended configuration and controllably unlockable for controllably telescopically collapsing the rod assembly 30. The rod assembly 30 is useful for holding a panel in an open position to provide a user access to an opening covered by the panel. The rod assembly 30 comprises the bearing end 32 and the latching end 34 spaced at an end of the rod assembly 30 distal from the bearing end. The retention assembly includes the locking sleeve assembly 36 having an inner tube 42 and an outer tube 40. Structures and components are provided in the retention assembly facilitating controlled locking and unlocking of the tubes 40, 42 relative to each other. The locking sleeve assembly 36 includes a sleeve 70 extending over potions of the inner tube 42 and outer tube 40, a retaining ring 102 for retaining engagement structures on the sleeve and in engagement with the inner tube and outer tube. The spring 96 is coupled to the sleeve and the outer tube.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims. The scope of the following claims is to be accorded the broadest interpretation so as to encompass all such modifications and equivalent structures and functions.

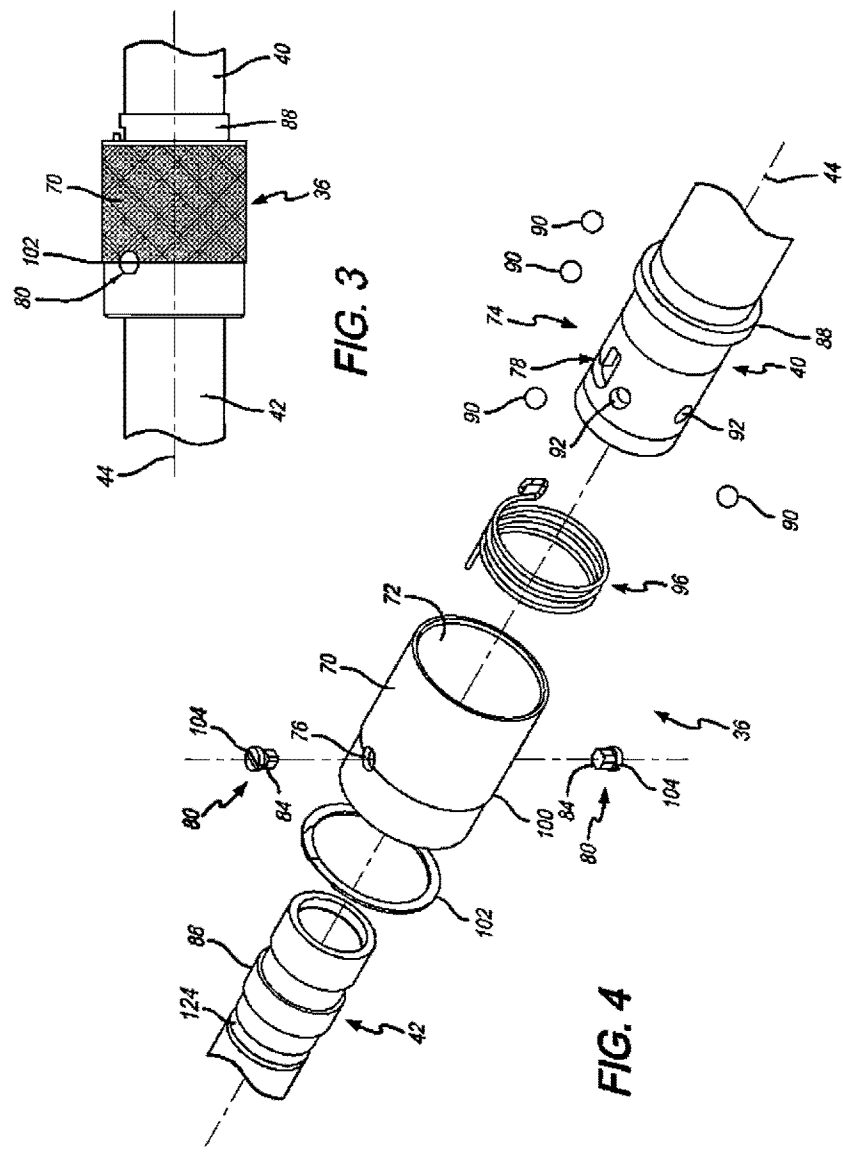

The invention claimed is:

1. A telescoping hold open rod assembly for use in holding a panel in an open position at the selection of a user to access an opening covered by the panel, the rod assembly comprising:
   an inner tube formed to include an annular groove;
   an outer tube formed to include an L-shaped slot and a hole, the outer tube configured to receive the inner tube at least partially therein and allow telescoping movement of the inner tube relative to the outer tube along an axis between an extended position where the annular groove is generally aligned with the hole and a collapsed position where the annular groove is spaced apart from the hole;
   a bearing positioned at an end of one of the inner tube and outer tube and a latch spaced apart from and positioned at an opposing end of the other of the inner tube and outer tube from the bearing; and
   a locking mechanism including a sleeve carried on the outer tube, a ball bearing positioned in the hole of the outer tube between the sleeve and the inner tube, and a pin configured to extend through the sleeve into the L-shaped slot of the outer tube and control motion of the sleeve relative to the outer tube;
   wherein the sleeve is configured to translate axially and rotate about the axis relative to the outer tube when the ball bearing is received in the annular groove of the inner tube to capture the ball bearing in the annular groove and lock the rod assembly in the extended position.

2. The hold open rod assembly of claim 1, wherein the sleeve is formed to include a cutout and a groove intersecting the cutout.

3. The hold open rod assembly of claim 2, wherein the ball bearing is configured to ride in the groove and the cutout of the sleeve during movement of the sleeve relative to the outer tube.

4. The hold open rod assembly of claim 1, wherein the L-shaped slot includes an axial portion generally aligned with the axis and a circumferential portion generally perpendicular to the axis.

5. The hold open rod assembly of claim 4, wherein the pin is configured to engage with the axial portion of the L-shaped slot to block rotation of the sleeve relative to the outer tube while the pin is positioned in the axial portion of the L-shaped slot, and wherein the pin is configured to engage with the circumferential portion of the L-shaped slot to block axial movement of the sleeve relative to the outer tube while the pin is positioned in the circumferential portion of the L-shaped slot.

6. The hold open rod assembly of claim 4, wherein the L-shaped slot further includes a notch forming at least a part of the circumferential portion of the L-shaped slot, and wherein the notch is configured to receive the pin to block rotation of the sleeve relative to the outer tube at the selection of a user.

7. The hold open rod assembly of claim 6, wherein the hole is elongated and configured to allow axial movement of the ball bearing relative to the outer tube and to allow the pin to be removed from the notch of the L-shaped slot through axial movement of the sleeve and ball bearing relative to the outer tube.

8. The hold open rod assembly of claim 1, wherein the outer tube further includes a first surface extending toward the axis and positioned adjacent the hole, wherein the inner tube further includes a second surface extending away from the axis and positioned adjacent the annular groove, and wherein the first surface and the second surface are configured to engage with one another to block removal of the inner tube from the outer tube during movement of the inner tube relative to the outer tube toward the extended position.

9. A telescoping hold open rod comprising:
an inner tube formed to include an annular groove;
an outer tube formed to include an L-shaped slot and a hole circumferentially spaced apart from the L-shaped slot, the outer tube configured to receive the inner tube at least partially therein and allow telescoping movement of the inner tube relative to the outer tube along an axis between an extended position where the annular groove is generally aligned with the hole and a collapsed position where the annular groove is spaced apart from the hole; and
a locking mechanism including an annular sleeve carried on the outer tube, a ball bearing positioned in the hole of the outer tube between the sleeve and the inner tube, and a pin configured to extend through the sleeve into the L-shaped slot of the outer tube and control motion of the sleeve relative to the outer tube;
wherein the sleeve is configured to translate axially and rotate about the axis relative to the outer tube when the ball bearing is received in the annular groove of the inner tube to capture the ball bearing in the annular groove and lock the rod assembly in the extended position.

10. The hold open rod of claim 9, wherein the sleeve is formed to include a cutout and a groove intersecting the cutout.

11. The hold open rod of claim 10, wherein the cutout is configured to allow axial movement of the sleeve relative to the outer tube, wherein the groove is configured to allow rotation of the sleeve relative to the outer tube, and wherein the ball bearing is configured to ride in the groove and the cutout of the sleeve during movement of the sleeve relative to the outer tube.

12. The hold open rod of claim 9, wherein the L-shaped slot includes an elongated axial portion extending generally along the axis and an elongated circumferential portion extending generally perpendicular to the axis.

13. The hold open rod of claim 12, wherein the pin is configured to engage with the axial portion of the L-shaped slot to block rotation of the sleeve relative to the outer tube while the pin is positioned in the axial portion of the L-shaped slot, and wherein the pin is configured to engage with the circumferential portion of the L-shaped slot to block axial movement of the sleeve relative to the outer tube while the pin is positioned in the circumferential portion of the L-shaped slot.

14. The hold open rod of claim 12, wherein the L-shaped slot further includes a notch forming at least a part of the circumferential portion of the L-shaped slot, and wherein the notch is configured to receive the pin to block rotation of the sleeve relative to the outer tube at the selection of a user.

15. The hold open rod of claim 14, wherein the hole is elongated and configured to allow axial movement of the ball bearing relative to the outer tube and to allow the pin to be removed from the notch of the L-shaped slot through axial movement of the sleeve and ball bearing relative to the outer tube.

16. The hold open rod of claim 9, wherein the outer tube further includes a first surface extending toward the axis and positioned adjacent the hole, wherein the inner tube further includes a second surface extending away from the axis and positioned adjacent the annular groove, and wherein the first surface and the second surface are configured to engage with one another to block removal of the inner tube from the outer tube during movement of the inner tube relative to the outer tube toward the extended position.

17. A telescoping hold open rod assembly for use in holding a panel in an open position at the selection of a user to access an opening covered by the panel, the rod assembly comprising:
an inner tube having a first end and a second end spaced apart from the first end, the second end formed to include an annular groove and a first surface extending outward from the inner tube adjacent the annular groove;
an outer tube having a third end and a fourth end spaced apart from the third end, the fourth end formed to include an L-shaped slot, a hole circumferentially spaced apart from the L-shaped slot, and a second surface extending inward from the outer tube adjacent the hole, the outer tube configured to receive the inner tube at least partially therein and allow telescoping movement of the inner tube relative to the outer tube along an axis between an extended position where the annular groove is generally aligned with the hole and a collapsed position where the annular groove is spaced apart from the hole;
a bearing positioned at one of the first and third ends and a latch positioned at the other of the first and third ends; and
a locking mechanism including a sleeve carried on the outer tube, a ball bearing positioned in the hole of the outer tube between the sleeve and the inner tube, and a pin configured to extend through the sleeve into the L-shaped slot of the outer tube and control motion of the sleeve relative to the outer tube, the sleeve formed to include a cutout and a groove intersecting the cutout;
wherein the cutout is configured to allow axial movement of the sleeve relative to the outer tube, the groove is configured to allow rotation of the sleeve relative to the outer tube, the ball bearing is configured to ride in the groove and the cutout of the sleeve during movement of the sleeve relative to the outer tube, the sleeve is configured to translate axially and rotate about the axis relative to the outer tube when the ball bearing is received in the annular groove of the inner tube to capture the ball bearing in the annular groove and lock the rod assembly in the extended position, and the first surface and the second surface are configured to engage with one another to block removal of the inner tube from the outer tube during movement of the inner tube relative to the outer tube toward the extended position.

18. The hold open rod assembly of claim 17, wherein the L-shaped slot includes an elongated axial portion extending generally along the axis, an elongated circumferential portion extending generally perpendicular to the axis, and a notch forming at least a part of the circumferential portion of the L-shaped slot, wherein the pin is configured to engage with the axial portion of the L-shaped slot to block rotation of the sleeve relative to the outer tube while the pin is positioned in the axial portion of the L-shaped slot, wherein the pin is configured to engage with the circumferential portion of the L-shaped slot to block axial movement of the sleeve relative to the outer tube while the pin is positioned in the circumferential portion of the L-shaped slot, and wherein the notch is configured to receive the pin to block rotation of the sleeve relative to the outer tube at the selection of a user.

19. The hold open rod assembly of claim 18, further comprising a spring coupled to the sleeve and the outer tube, the spring configured to circumferentially bias the sleeve relative to the outer tube.

20. The hold open rod assembly of claim 19, further comprising a retaining ring coupled to the sleeve and engaged with the pin to block the pin from removal from the L-shaped slot.

* * * * *

UNITED STATES PATENT AND TRADEMARK OFFICE
CERTIFICATE OF CORRECTION

| | |
|---|---|
| PATENT NO. | : 9,580,945 B2 |
| APPLICATION NO. | : 14/440805 |
| DATED | : February 28, 2017 |
| INVENTOR(S) | : Artin |

It is certified that error appears in the above-identified patent and that said Letters Patent is hereby corrected as shown below:

In the Drawings

Figure 13:
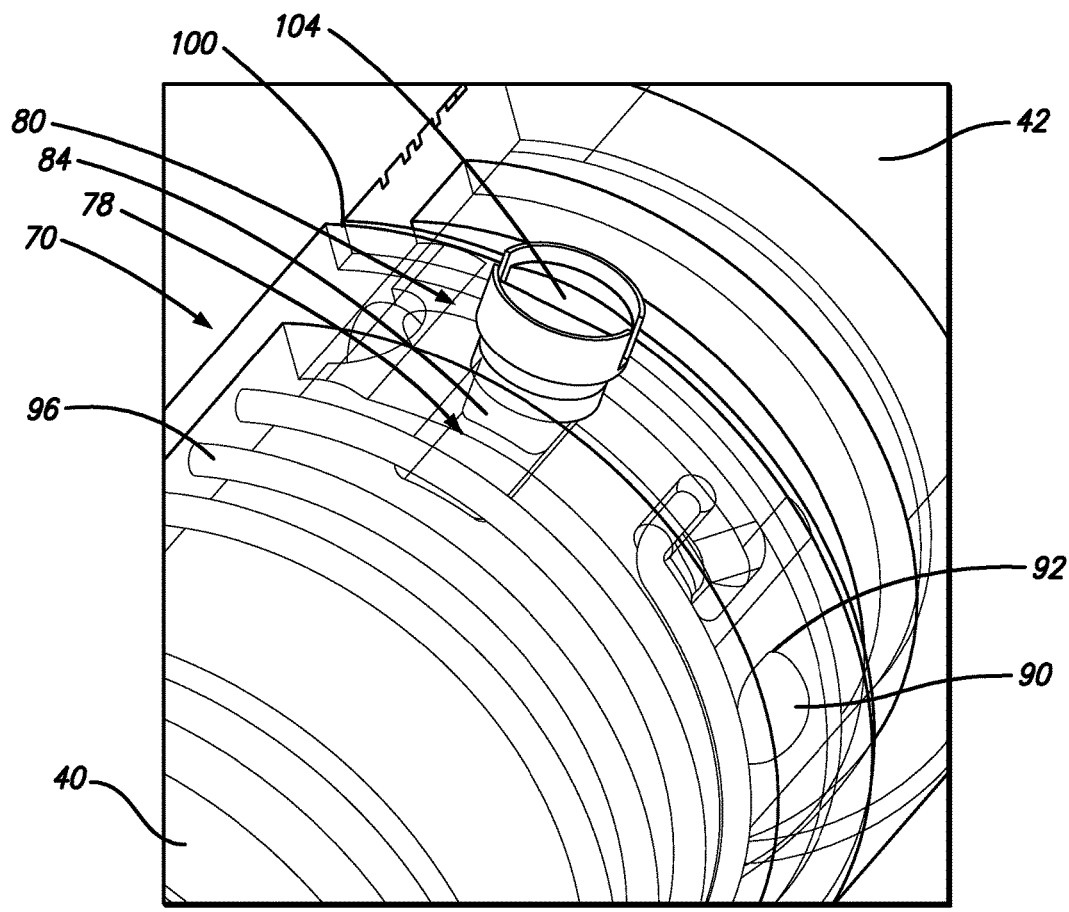
FIG. 13 shows a third step in the process of extending the rod assembly.
Figure 14:
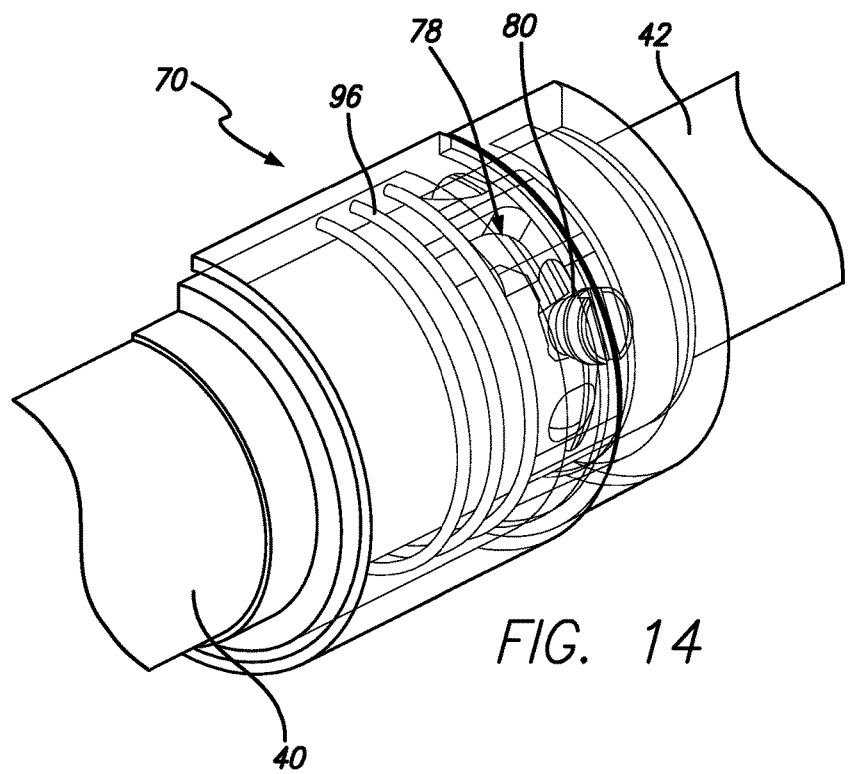
FIG. 14 is an illustration showing rotation of sleeve carrying the pin.
Figure 16:
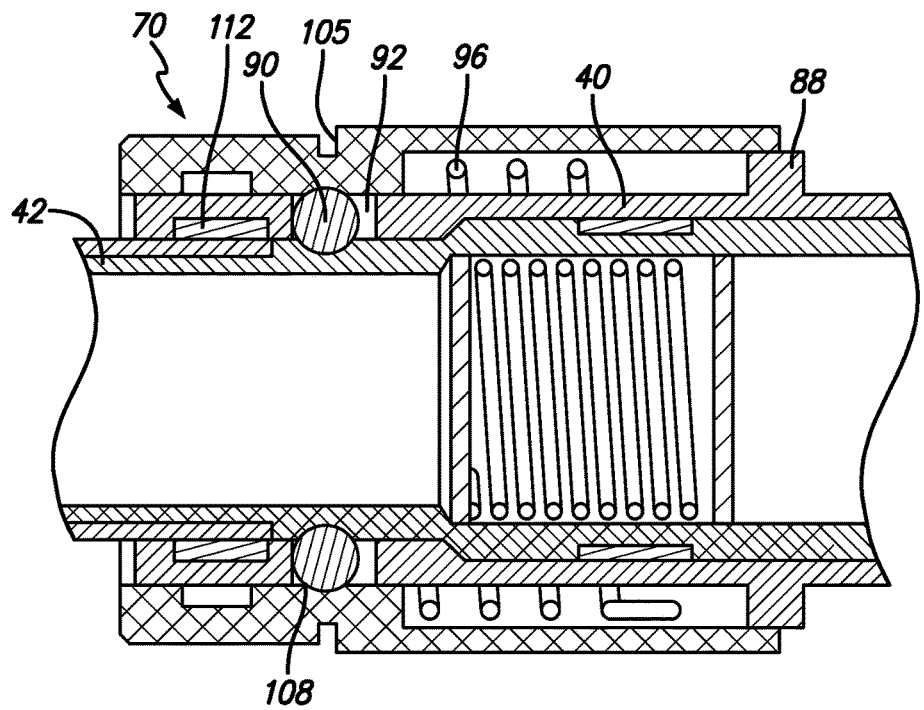
FIG. 16 shows the rod assembly in an extended condition and in which the rod is placed in tension it resulting in mating surfaces carrying the load of forces applied to the rod assembly in this condition.
Figure 18:
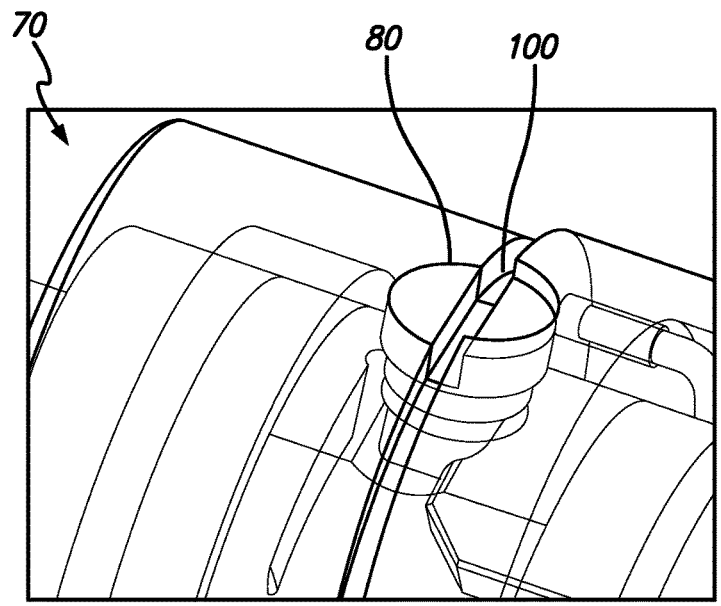
FIGS. 18 and 19 show enlarged views of the relative position of the pin in the corresponding L-slot.
Figure 20:
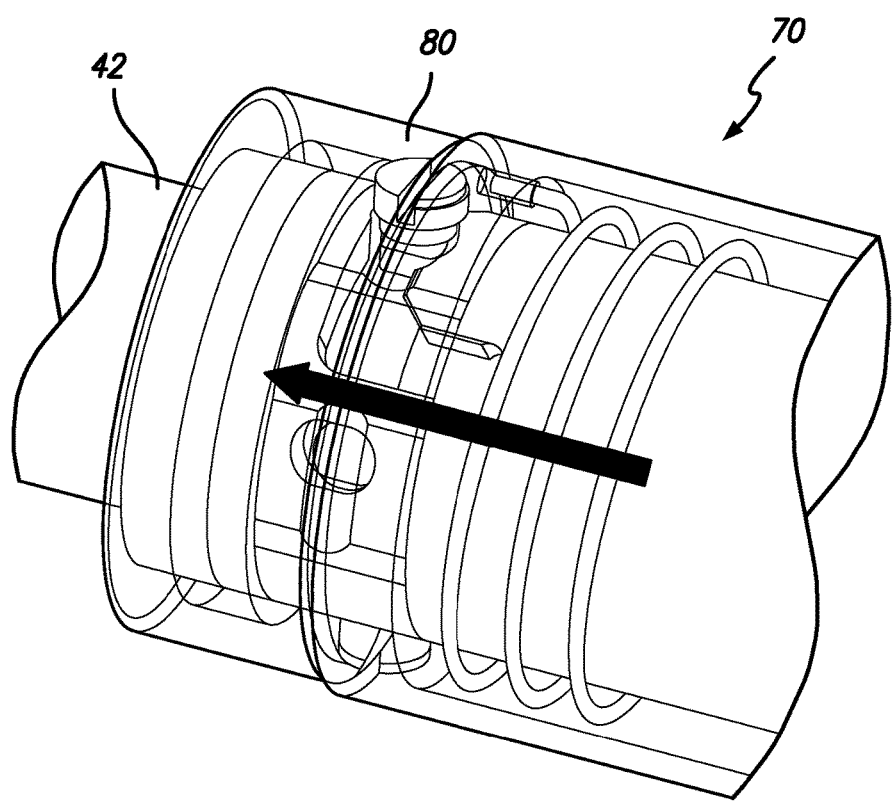
FIG. 20 shows the relationship of the components of the locking sleeve assembly with the rod assembly in a compressive load.
Figure 5:
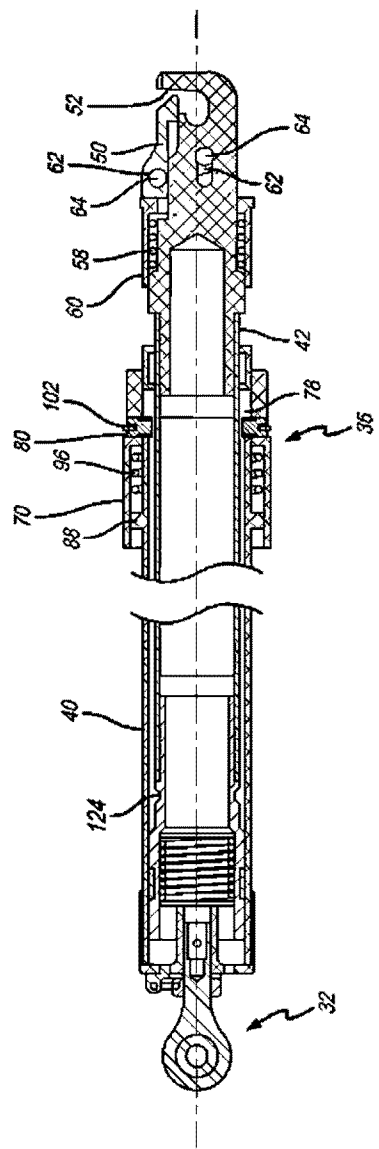
Figure 6:
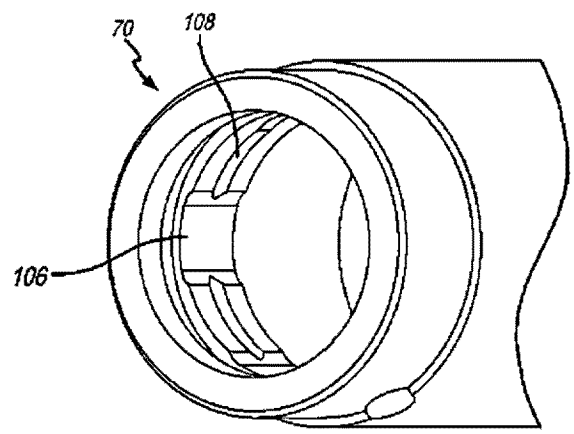
Figure 7:
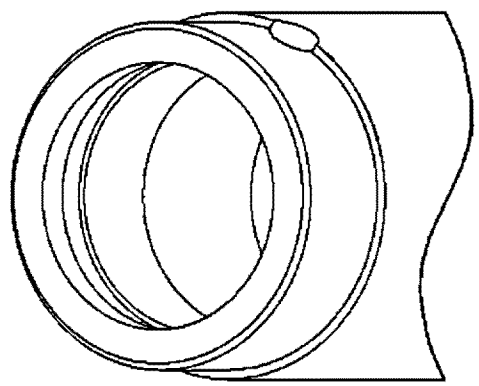
Figure 11:
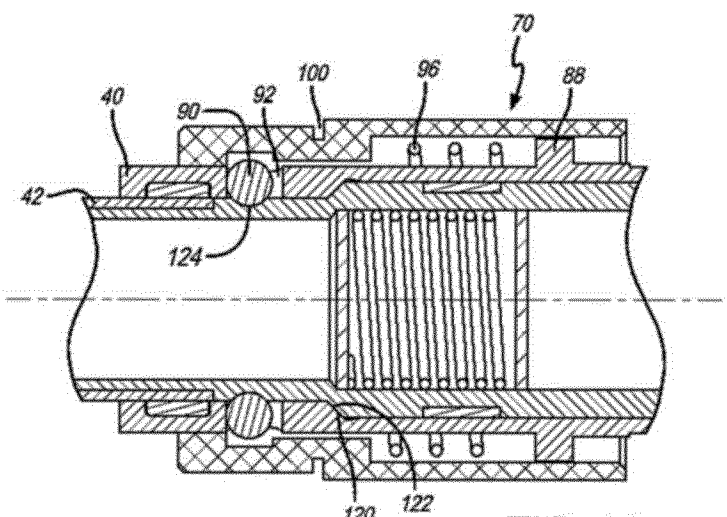
Figure 12:
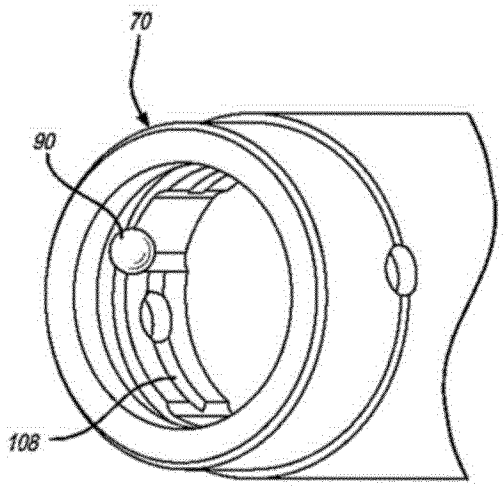
Figure 13:
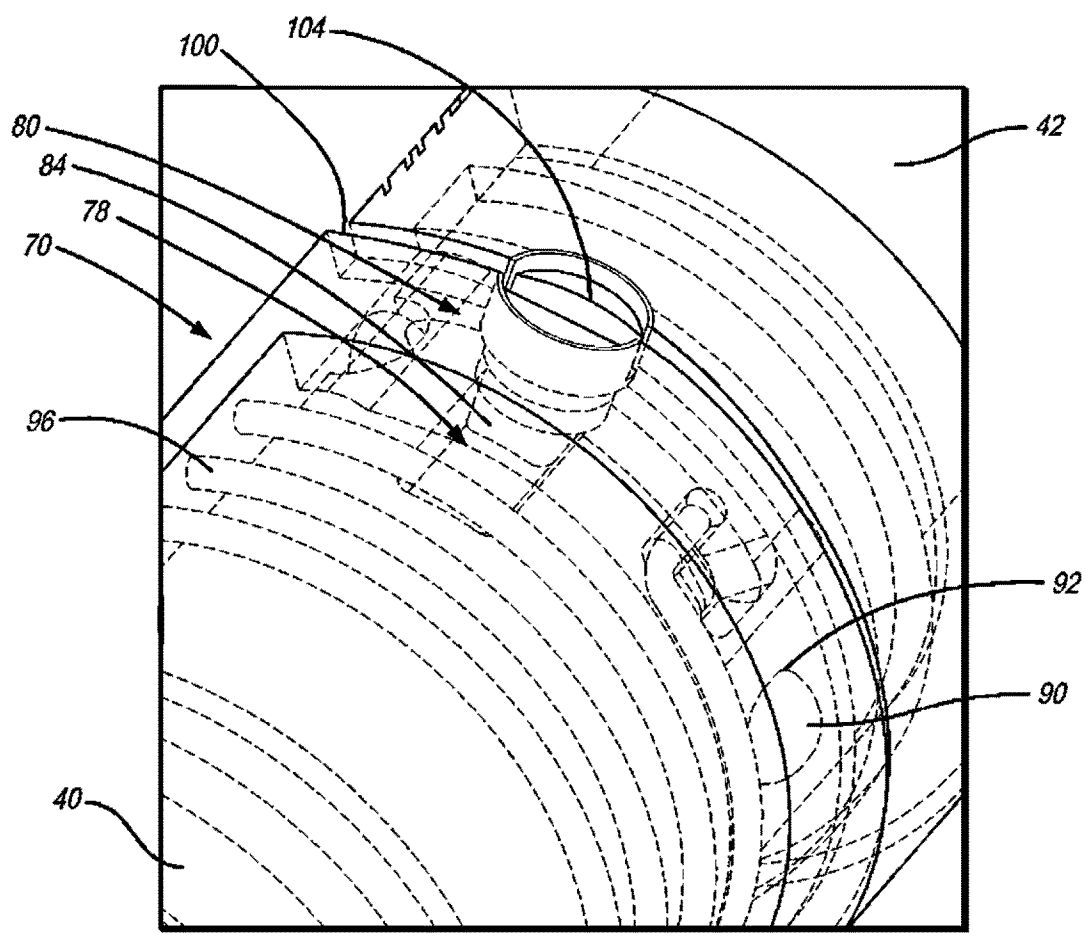
Figure 14:
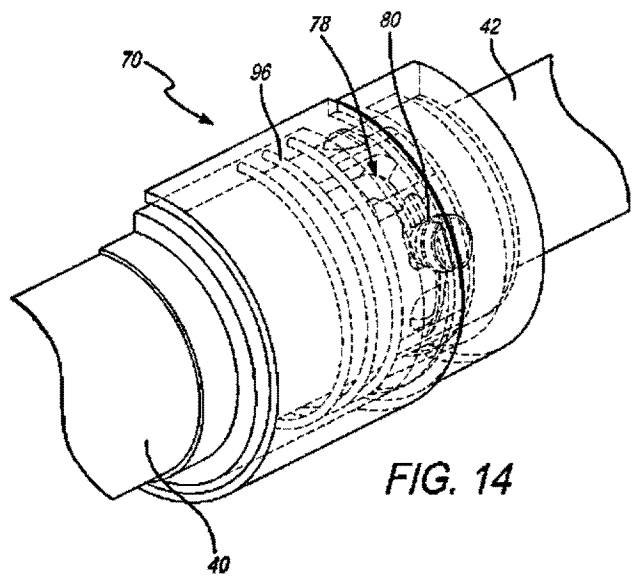
Figure 15:
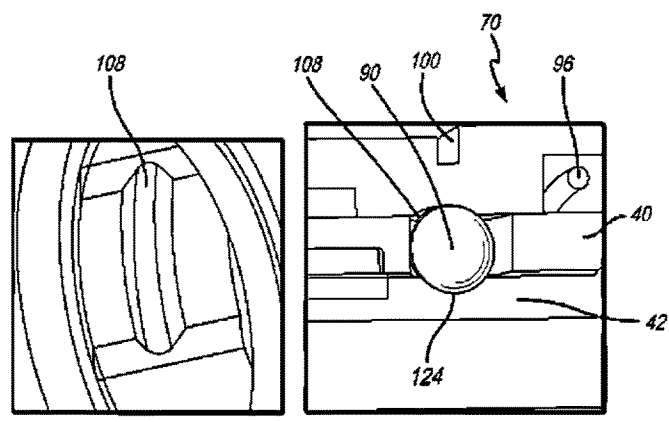
Figure 16:
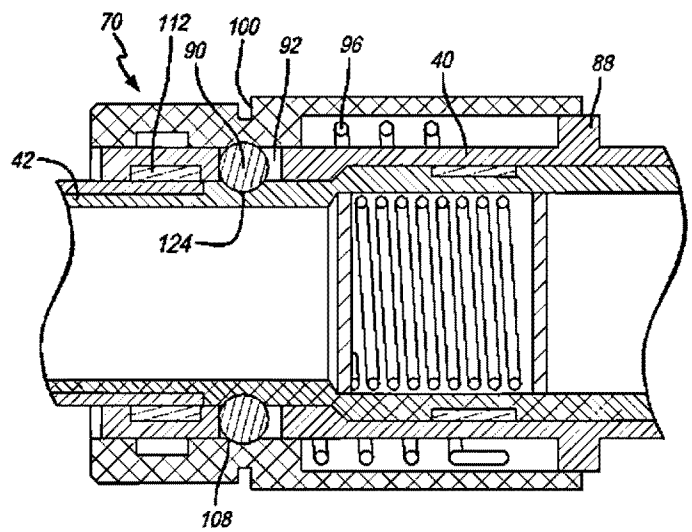
Figure 17:
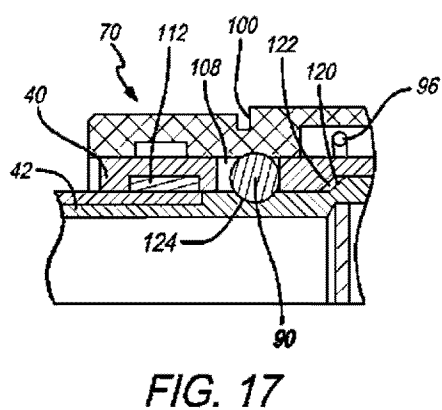
Figure 18:
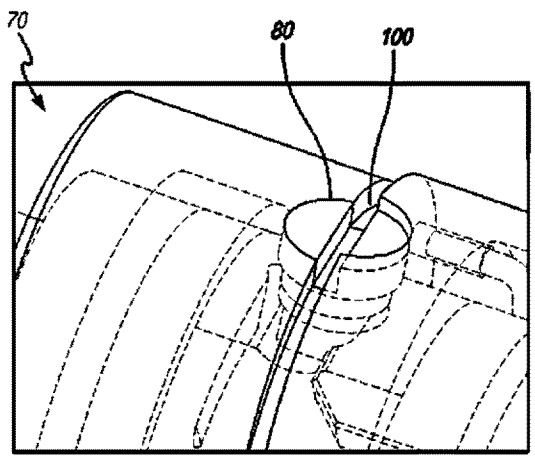
Figure 19:
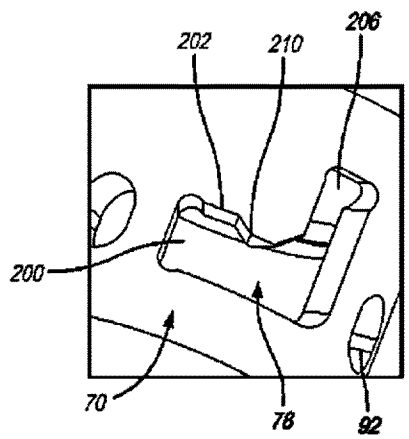
Figure 20:
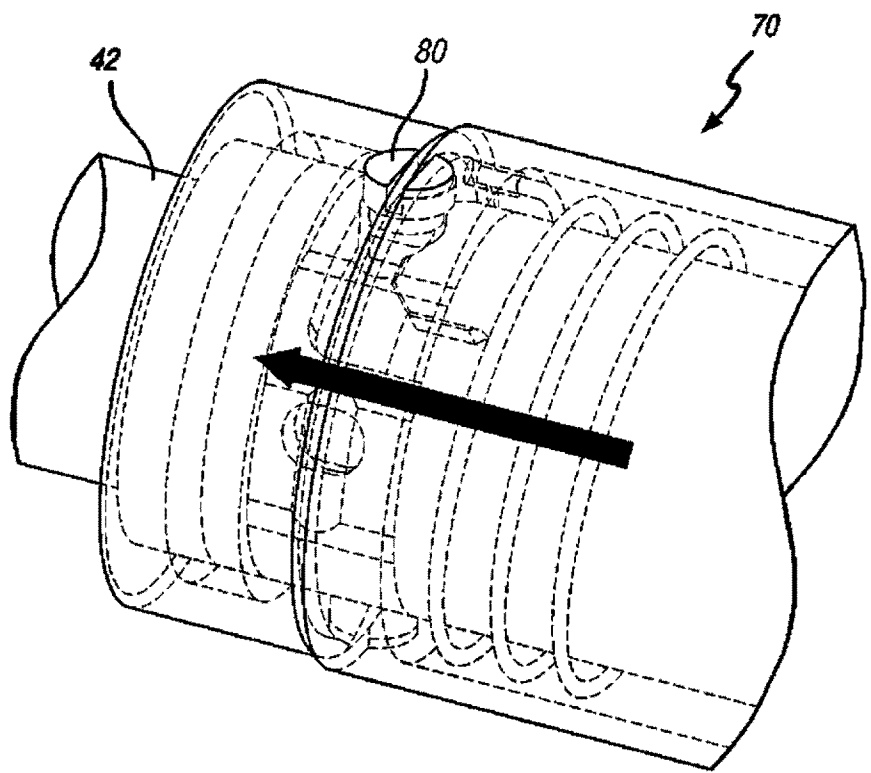

Please correct the drawings of FIGS. 3-4 as shown on the attached drawing sheet.
Please correct the drawing of FIG. 5 as shown on the attached drawing sheet.
Please correct the drawings of FIGS. 6-7 as shown on the attached drawing sheet.
Please correct the drawings of FIGS. 11-12 as shown on the attached drawing sheet.
Please correct the drawing of FIG. 13 as shown on the attached drawing sheet.
Please correct the drawings of FIGS. 14-15 as shown on the attached drawing sheet.
Please correct the drawings of FIGS. 16-17 as shown on the attached drawing sheet.
Please correct the drawings of FIGS. 18-19 as shown on the attached drawing sheet.
Please correct the drawing of FIG. 20 as shown on the attached drawing sheet.

Signed and Sealed this
Sixteenth Day of June, 2020

Andrei Iancu
*Director of the United States Patent and Trademark Office*